2,881,454
TAPPING TOOL WITH DRIVE RELEASE MEANS

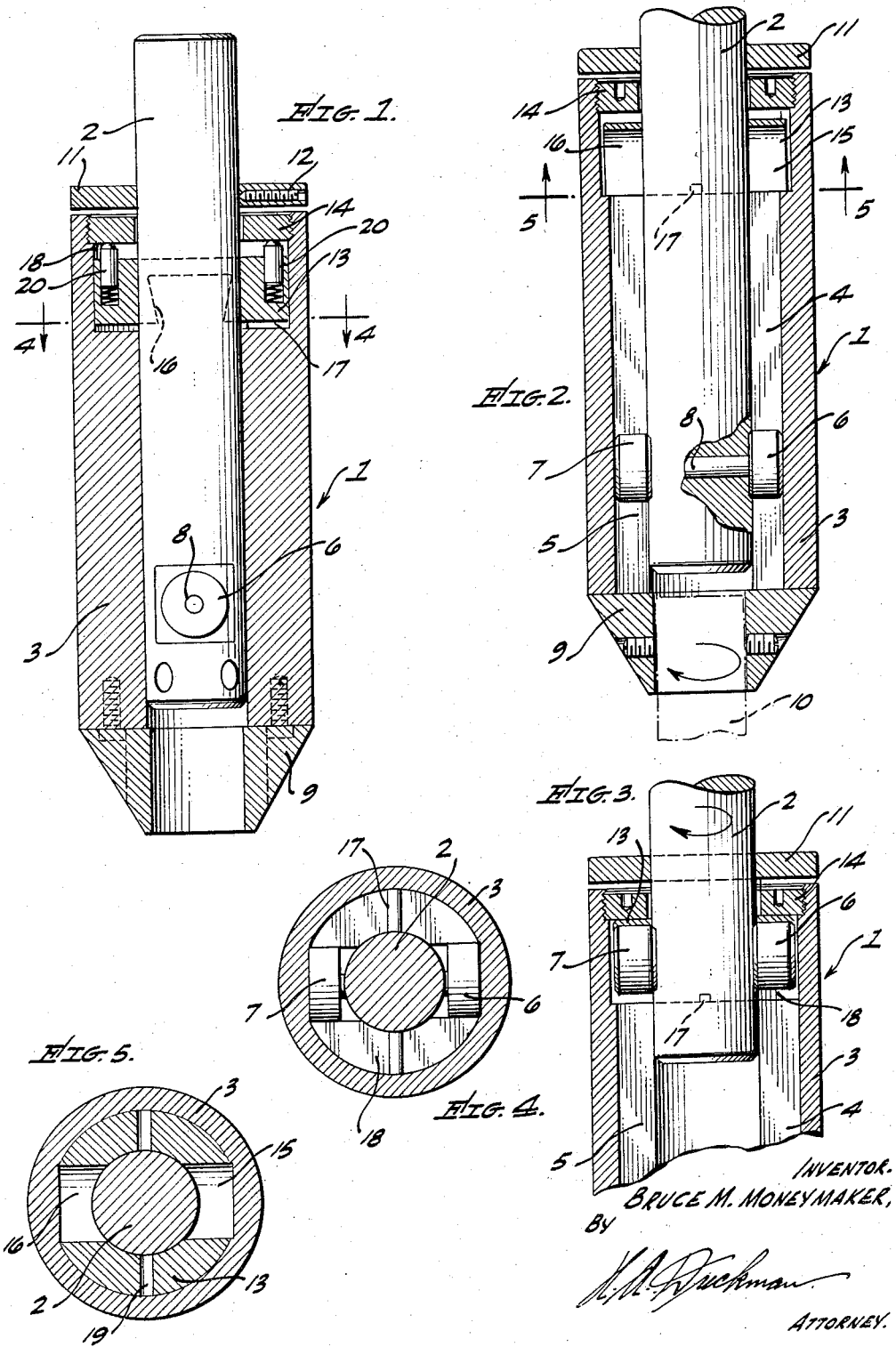

Bruce M. Moneymaker, Los Angeles, Calif.

Application October 4, 1956, Serial No. 613,942

4 Claims. (Cl. 10—129)

This invention relates to a tapping tool or attachment for drill presses, lathes, turret lathes, and the like, and other machine tools having a rotating head chuck or the like, and relates particularly to an automatic means of releasing the tool holder. The tool is either a tap or die, and my invention relates to means whereby this tool is released from the driving shank of the holder when the tool (tap or die) has reached the end of its travel.

An object of my invention is to provide a novel tapping tool in which the mandrel or driving shank on which the tap is mounted is freely movable in a longitudinal direction, so that the tap threads and proceeds into the work at the proper angle and without being retarded or hindered in any way by any drag of the mandrel and, therefore, the threads are cut at the correct angle. Also when the tap or drill has completed its work the tool holder is released from driving engagement with the shank or mandrel, thus automatically preventing further cutting or movement of the tool.

Other objects, advantages and features of invention may appear from the accompanying drawing, the subjoined detailed description and the appended claims.

In the drawing:

Figure 1 is a longitudinal sectional view of my tapping tool.

Figure 2 is a longitudinal sectional view of the same taken at right angles to Figure 1.

Figure 3 is a fragmentary longitudinal sectional view of the upper portion of the tapping tool.

Figure 4 is a sectional view taken on line 4—4 of Figure 1.

Figure 5 is a sectional view taken on line 5—5 of Figure 2.

Referring more particularly to the drawing, my tapping tool 1 is mounted on and is driven by a machine tool, such as a drill press, lathe, or the like (not shown). A shank or mandrel 2 is fixedly mounted in the chuck or the machine tool, and while it is rotated by the machine tool it cannot move longitudinally. A sleeve 3 surrounds the mandrel 2 and this sleeve is rotated with the mandrel in the following manner: A pair of oppositely arranged longitudinal grooves 4—5 are formed in the sleeve 3, and these grooves extend from top to bottom of the sleeve. A pair of rollers 6—7 are mounted on a pin 8 which extends transversely through the mandrel 2. These rollers extend into and accurately fit within the grooves 4—5, respectively, and thus cause the sleeve 3 to rotate with the mandrel 2 as the machine rotates that mandrel. It will thus be evident that the sleeve 3 can advance or move longitudinally relative to the mandrel 2 as the tap or die advances in the work. A chuck 9, on the lower end of the sleeve 3, grips the tap or other tool 10 in the usual and well known manner. The tap or die as it cuts will advance in the work and, consequently, will pull the sleeve 3 downwardly with relation to the mandrel 2. A ring 11 may be adjustably secured to the mandrel 2 by the set screw 12. The ring thus bears against the top of the sleeve 3 and adjustably positions the sleeve on the mandrel 2. The purpose of this is to enable the operator to adjust the total movement of the sleeve 3 on the mandrel 2, depending upon the length of the tap or die 10 and the total movement of the sleeve 3 in performing its work. A collar 13 surrounds the mandrel 2 and fits into the top of the sleeve 3. The collar 13 has a limited longitudinal movement within the sleeve 3, as will be further described. A nut 14 screws into the sleeve 3 above the collar 13 and serves to limit the upward movement of that collar. The collar 13 is formed with oppositely arranged recesses 15 and 16 which are aligned with the grooves 4—5, respectively. Thus as the sleeve 3 is moved downwardly by the tap or die 10 the rollers 6—7 will be moved into the recesses 15—16, respectively, to the position shown in Figure 3. The collar 13 will now be pushed upwardly until it engages the nut 14 and the driving connection to the sleeve 3 is released as follows:

A pair of radial dogs 17—17 project upwardly from the sleeve 3 and into the circular space 18 which is occupied by the collar 13. The collar 13 is formed with a pair of complementary grooves 19—19 which receive the dogs 17 in one position of the collar, that is, when the collar is pushed downwardly. The collar is normally held in contact with the dogs 17 by the spring detents 20—20. Thus the sleeve 3 will rotate with the mandrel 2 at all times until the rollers 6—7 enter the collar 13 and push that collar upwardly against the spring detents 20, and until the grooves 19 move away from the dogs 17. In this position, as shown in Figure 3, the mandrel 2 is free to rotate independently of the sleeve 3. Therefore, the driving force on the tap 10 is removed and further drill or tapping stops. The work is now removed from the machine and other work reinserted.

The side walls of the recesses 15—16 are each tapered in an upward direction so that the rollers 6—7 will more easily enter these recesses, and also so that the rollers will readily release or move out of the recesses during the operation of the tool. This taper is especially useful when there is pressure on the rollers and against the side walls of the recesses 15—16 to enable the rollers to readily move out of the recesses without binding.

In operation

The sleeve 3 is mounted on the mandrel 2 and adjusted by means of the ring 11 to correspond to the length of the desired tap or die to be cut by the tool 10. The machine tool now drives the sleeve 3 through the rollers 6—7 and these rollers gradually move upwardly in the grooves 4—5, respectively. The sleeve 3 is being moved downwardly constantly by the cutting action of the tap or drill 10. When the rollers 6—7 reach the top of their movement, that is, they extend into the collar 13 and into the complementary recesses 15—16 in this collar. The rollers 6—7 now push the collar 13 upwardly against the tension of the detents 20 until the grooves 19 move away from the dogs 17, thus permitting free rotation of the collar 13 and releasing further driving forces to the sleeve 3.

Having described my invention, I claim:

1. A tapping tool comprising a mandrel adapted to be secured to and rotated by a machine tool, a sleeve surrounding said mandrel for rotation therewith and movable longitudinally thereof, a chuck on said sleeve adapted to hold a thread cutting tool, said sleeve having a groove extending longitudinally thereof, a roller, means mounting said roller on the mandrel, said roller fitting in said groove, a collar surrounding the mandrel and positioned within the sleeve, said collar having an axial recess therein aligned with said groove and of a length to completely receive the roller therein, means detachably coupling the collar and sleeve, said collar having a limited axial movement relative to the sleeve to release said coupling means, said roller entering the recess in the extended position of the mandrel to move the collar axially so as to release the collar from the sleeve.

2. A tapping tool comprising a mandrel adapted to be secured to and rotated by a machine tool, a sleeve surrounding said mandrel for rotation therewith and movable longitudinally thereof, a chuck on said sleeve adapted to hold a thread cutting tool, said sleeve having a groove extending longitudinally thereof, a roller, means mounting said roller on the mandrel, said roller fitting in said groove, a ring surrounding the mandrel and engageable with one end of the sleeve, and means releasably securing the ring to the mandrel, a collar surrounding the mandrel and positioned within the sleeve, said collar having an axial recess therein aligned with said groove and of a length to completely receive the roller therein, means detachably coupling the collar and sleeve, said collar having a limited axial movement relative to the sleeve to release said coupling means, said roller entering the recess in the extended position of the mandrel to move the collar axially so as to release the collar from the sleeve.

3. A tapping tool comprising a mandrel adapted to be secured to and rotated by a machine tool, a sleeve surrounding said mandrel for rotation therewith and movable longitudinally thereof, a chuck on said sleeve adapted to hold a thread cutting tool, said sleeve having a groove extending longitudinally thereof, a roller, means mounting said roller on the mandrel, said roller fitting in said groove, a collar surrounding the mandrel and positioned within the sleeve, said collar having an axial recess therein aligned with said groove and of a length to completely receive the roller therein, means detachably coupling the collar and sleeve, said collar having a limited axial movement relative to the sleeve to release said coupling means, said roller entering the recess in the extended position of the mandrel to move the collar axially so as to release the collar from the sleeve, and spring means engaging said collar and urging the collar into coupling engagement with the sleeve.

4. A tapping tool comprising a mandrel adapted to be secured to and rotated by a machine tool, a sleeve surrounding said mandrel for rotation therewith and movable longitudinally thereof, a chuck on said sleeve adapted to hold a thread cutting tool, said sleeve having a groove extending longitudinally thereof, a roller, means mounting said roller on the mandrel, said roller fitting in said groove, a ring surrounding the mandrel and engageable with one end of the sleeve, and means releasably securing the ring to the mandrel, a collar surrounding the mandrel and positioned within the sleeve, said collar having an axial recess therein aligned with said groove and of a length to completely receive the roller therein, means detachably coupling the collar and sleeve, said collar having a limited axial movement relative to the sleeve to release said coupling means, said roller entering the recess in the extended position of the mandrel to move the collar axially so as to release the collar from the sleeve, and spring means engaging said collar and urging the collar into coupling engagement with the sleeve.

References Cited in the file of this patent

UNITED STATES PATENTS

| | | |
|---|---|---|
| 987,659 | Wells | Mar. 21, 1911 |
| 2,281,416 | Cote | Apr. 28, 1942 |
| 2,344,622 | Le Tourneau | Mar. 21, 1944 |
| 2,504,018 | Gibson | Apr. 11, 1950 |